INVENTORS:
MALDEN C. LOWMAN JR.
RICHARD R. HUGHES
ARTHUR W. NELSON
BY: Oswald W. Wilmore
THEIR ATTORNEY

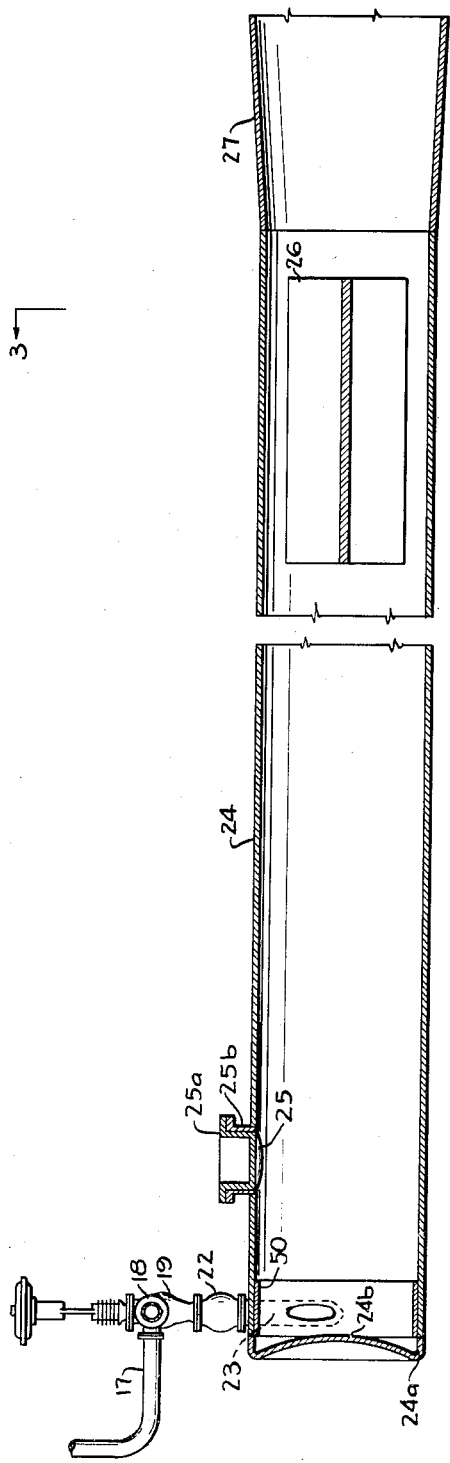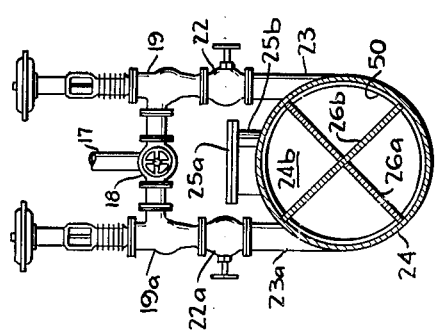

United States Patent Office 2,726,198
Patented Dec. 6, 1955

2,726,198

FLASH VAPORIZING METHOD AND APPARATUS

Malden C. Lowman, Jr., San Rafael, Richard R. Hughes, San Anselmo, and Arthur W. Nelson, San Leandro, Calif., assignors to Shell Development Company, Emeryville, Calif., a corporation of Delaware Application December 30, 1953, Serial No. 401,208

10 Claims. (Cl. 196—77)

The invention relates to a method and apparatus for flash vaporizing liquid mixtures, especially hydrocarbon oil, followed by separation of the resulting dispersion into liquid and vapor constituents in a centrifugal separator, such as a cyclone. The invention is applicable to any liquid mixture, such as a heavy petroleum oil fraction from which low-boiling constituents have been removed by a prior operation, such as a preliminary flashing step; it is particularly suited to vacuum flashing, although not limited thereto.

In vacuum flashing operations the liquid fraction is heated in a furnace and flashed by discharge from a confined flow channel into a flashing chamber of larger cross sectional area and maintained at a pressure lower than that prevailing in the confined channel. The sudden expansion produces rapid vaporization of the lower boiling components of the liquid and the formation of a multitude of fine liquid drops from the surfaces of which vaporization continues until equilibrium is established between the vapor and liquid. Sufficient time must be allowed for substantial attainment of equilibrium prior to separation. The formation of such small liquid drops is desirable to reduce the time required to attain equilibrium; however, they also present a difficulty in that the resulting dispersion of fine drops in the vapor is difficult to separate.

It is an object of the invention to improve the attainment of equilibrium and the separation of dispersed liquid from vapor in a flashing operation.

A further object is to provide an improved apparatus for flashing operation, especially although not exclusively vacuum flashing, that includes a tubular transfer line between the expansion device and the centrifugal separator which performs the function of a flashing chamber and is especially constructed to effect coalescence of the dispersed liquids prior to admission to the separator.

Further objects will become apparent from the following specification.

In summary according to the invention the warm liquid (which may contain some vapor) is expanded suddenly from a confined flow channel, wherein it may have a pressure below, at, or above atmospheric, into a transfer tube of enlarged cross sectional area which is maintained at a reduced pressure with an angular motion about the axis of the tube, e. g., tangentially, thereby causing the formation of a dispersion of liquid in vapor, the resulting dispersion is flowed with a helical motion through the tube while coalescing fine liquid drops by contact with the wall of the tube, and the vapor and liquid are fed into a centrifugal separator chamber of the non-rotative type with a whirling motion about the axis of the separator chamber, the vortical motion of the fluid in the transfer tube being preferably partly or for the greater part eliminated prior to entry into the separator. In the separator, which may be of any desired type as understood in the separator art, the vapor flows with a generally vortical motion in a helical path, and the liquid settles toward the outer wall of the separating chamber whereon it is collected while the vapor is withdrawn from either at the top or bottom, depending upon the design of the separator.

The invention will be further described with reference to the accompanying drawing forming a part of this specification and showing one preferred embodiment, wherein:

Figure 2 is a longitudinal sectional view of the transfer tube; and

Figure 3 is a transverse sectional view, taken on the line 3—3 of Figure 2.

Figure 1:
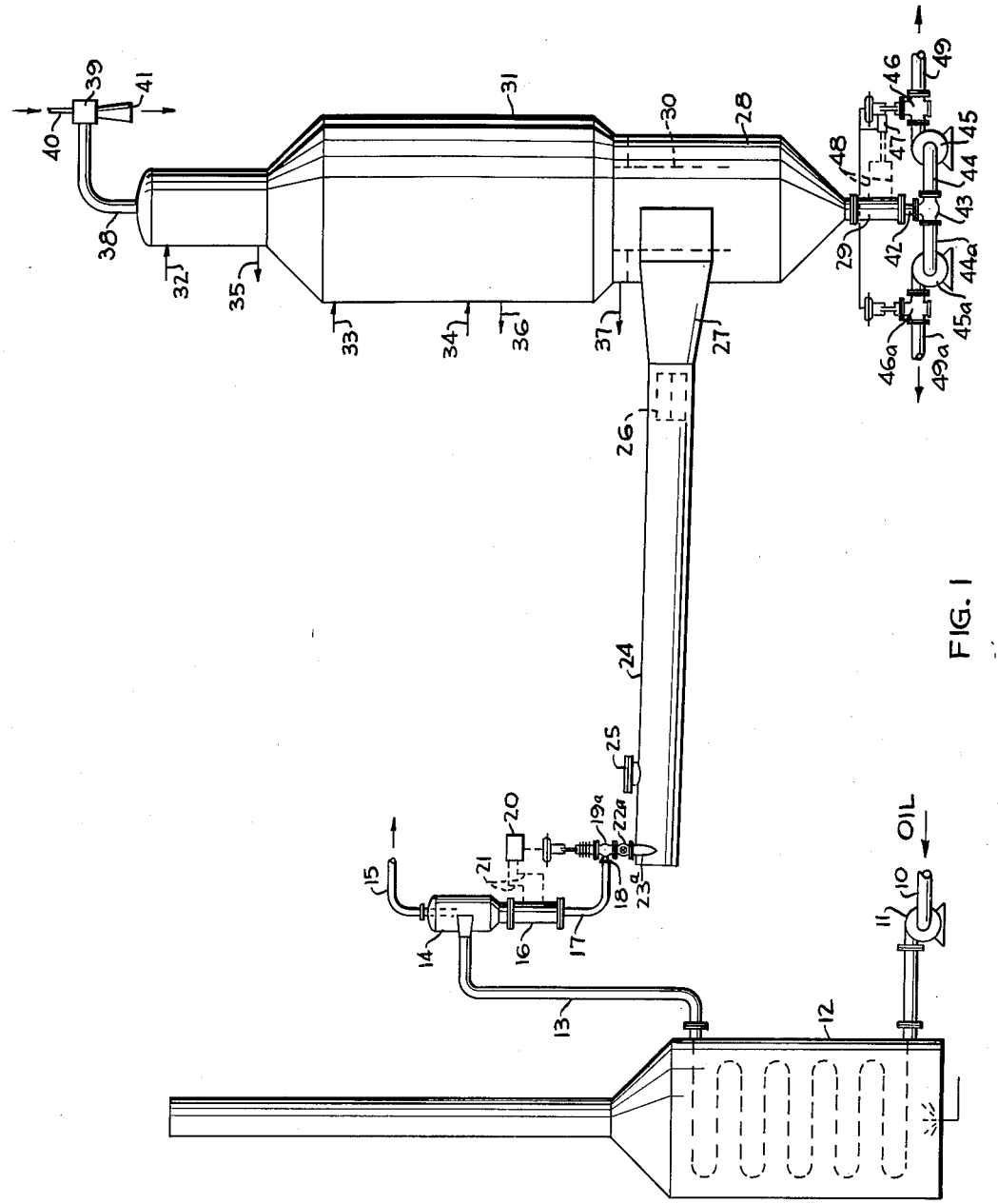
Figure 1 is a diagrammatic showing of portions of a typical oil fractionating system wherein the invention is embodied.

The application of the invention to a typical refinery operation is illustrated in Figure 1 in which the charge, which may for instance be a straight run residual oil, is admitted at 10 via a pump 11 and supplied to a furnace 12 in which it is heated to a desired temperature, which may be below or above cracking temperature, in accordance with the type of refinery operation involved. It should be noted that the temperature and pressure conditions given below are merely illustrative of a specific operation wherein some cracking occurs and are not restrictive of the scope of the claims appended hereto. Heated oil, e. g., at a temperature of 920° F. and a pressure of about 50 lbs. per sq. in. gauge, and containing vapor, is withdrawn from the furnace and charged via transfer line 13 to a cyclone separator 14 wherein vapor and liquid are separated, the vapor being discharged at 15 and supplied to a fractional distillation column (not shown). The separated liquid collects in a tubular section 16 at the bottom of the cyclone from which it is withdrawn via a pipe 17 and a three-position valve 18 at a rate controlled by a valve 19 or 19a connected one in each of the branched outlets from the valve 18, as shown in Figure 3.

The purpose of providing alternate valves 19 and 19a and pipes connected downstream thereof is to permit one to be serviced while the other is in operation; the valve 18 is a multi-port plug-type and makes it possible to direct the flow to either branch or to shut off both. Each of these valves 19 and 19a may be operated automatically by a differential pressure controller 20 that is responsive to the pressures at different levels in the section 16, indications of which are transmitted from sensing elements (not shown) via control lines represented by the dotted lines 21. The controller operates to maintain liquid at an intermediate level in the section 16.

The liquid, now at a temperature of 910° F. and a pressure of about 50 lbs. per sq. in. gauge, is admitted via a shut-off valve 22 or 22a and a corresponding pipe 23 or 23a tangentially into the inlet end of a transfer tube 24 which has an enlarged cross sectional area, is inclined downwardly from the inlet end, and has a manhole at the top closed by a flush cover 25 that has a cylindrical inner surface aligned with the cylindrical inner wall of the tube and is supported by a plate 25a bolted to a nozzle 25b. The transfer tube is maintained at a reduced pressure, e. g., about 20 mm. of Hg, absolute, and constitutes a low pressure zone. The open ends of the pipes 23 and 23a constitute expansion devices, whereby the liquid is rapidly expanded upon entering the tube, causing adiabatic vaporization or flashing of low-boiling constituents, accompanied by a temperature drop to about 813° F., and the formation of a dispersion of fine drops of liquid in vapor. This dispersion moves with a generally helical or vortical motion along the length of the tube, which has a length sufficient to permit equilibrium to be reached between liquid and vapor. The vortical motion is advantageously stopped near the discharge end by a vortex breaker 26. The tube has a terminal transition section 27 that is circular at the inlet end thereof and rectangular at the discharge end, and is connected tangentially and with a slight downward slope to the outer wall of a cyclone separator 28. The total fluid is charged tangentially into the cyclone separator, wherein liquid and vapor are separated, the former being collected in a tubular section 29 and the latter flowing upwards through a coaxial discharge tube or chimney 30 to a suitable pressure-reducing system, such as a condenser, or condensation train, followed by an evacuator. The condenser may, for example, be embodied as a quenching column 31 containing gas-liquid contact trays (not shown) or the like.

The vapors are partly condensed in the column 31, quench and wash oils being admitted at various levels, such as those indicated by the arrows 32, 33 and 34, and liquid being withdrawn as indicated by the arrows 35, 36 and 37; the exact details of the column and the number and arrangement of the feed and draw-off streams will vary with the nature of the products desired and, being well-known in the art and not germane to the invention, will not be further described. Vapor is discharged from the column through a vapor duct 38 and is passed through an evacuating system, represented diagrammatically by an ejector 39 (which may comprise several stages) to which steam is admitted via a pipe 40, the mixed steam and oil vapor being discharged at 41. The vapors are evacuated so as to create a sufficiently low pressure in the column, cyclone separator and transfer tube to reduce the pressure in the last of these elements to the value above stated. The liquid is withdrawn from the bottom of the section 29 via a pipe 42, a three-position multi-port plug valve 43, and either the draw-off pipe 44 and pitch pump 45, or the pipe 44a and pump 45a, depending on the setting of the valve 43. The discharge rate is controlled by a valve 46 or 46a; these valves may both be operated automatically by a differential pressure controller 47 that is responsive to the pressures at different levels in the section 29, indications of which are transmitted from sensing elements (not shown) via control lines represented by the dotted lines 48. The controller operates to maintain liquid at an intermediate level in the section 29. The liquid is drawn off through a pipe 49 or 49a.

Referring more particularly to Figures 2 and 3, it will be noted that the tangential inlet tubes 23 and 23a, constituting confined flow channels for the passage of the liquid to be expanded, are in communication with the tube 24 at opposite sides and close to the end thereof, and that the end of the tube is closed by a closure 24a that advantageously is a flanged and reversed dished head; thus it has a re-entrant part 24b so as to be positioned close to the plane of the inlet tubes. The purposes of these details is to reduce as far as possible the dead space between the entering fluid and the end closure. An annular wear plate 50 is advantageously mounted in the tube at the inlet end. The vortex breaker 26 is shown to consist of a pair of mutually perpendicular flow guide vanes 26a, 26b, both inclined 45° to the vertical to facilitate maintenance by permitting a workman to crawl along the bottom.

When the liquid emerges from the inlet tube 23 or 23a into the tubular low pressure zone it expands suddenly and assumes a whirling motion about the longitudinal axis of the tube 24 in an angular direction determined by the position of the plug valve 18, it being evident that only one inlet is used in any one operation. This vortical motion causes the very fine liquid droplets, produced by the sudden expansion from 50 lbs. per sq. in. gauge to about 20 mm. of Hg abs., to settle toward the peripheral region of the tube and to coalesce into larger drops that can be more easily separated in the cyclone separator 28. The slight slope of the tube—for example from about 1° to 10° to the horizontal—insures drainage of all liquid into the cyclone 28. The transition section 27 is optional and may have any conformation required to match the circular cross sectional shape of the tube 24 to the shape of the tangential inlet to the cyclone; the rectangular, vertically elongated cyclone inlet shown is merely illustrative of one preferred arrangement.

As regards the dimensions of the tube and the effect of the vortex breaker 26, the tube is advantageously of ample diameter to handle the vapors produced without undue pressure drop, and such low pressures as 20 mm. of Hg gauge can be achieved at the inlet end only by the use of large diameter tubes. As an example, the tube 24 may be 2 to 5 feet in diameter for a flow of oil of about 500 bbls. per hour, measured as liquid. The tube must have sufficient length to achieve substantial equilibrium between liquid and vapor and a length of at least ten diameters is advantageous. Excessive lengths should, however, be avoided because of the temperature drop due to radiation and convection and because of the tendency toward increased pressure drop. Any appreciable pressure drop in the tube would bring the pressure at the cyclone inlet to below that in the inlet portion of the tube, thereby bringing about progressive vaporization and poor separation. The most effective separation is achieved by making the pressures in the cyclone and the inlet end of the low pressure tube 24 as nearly alike as practicable and admitting the total fluid into the cyclone as soon as equilibrium has been attained.

The vortex breaker 26 further plays an important role in the separation. By altering the flow in the tube 24 from vortical flow to flow that is substantially linear, the kinetic energy of the fluid entering the cyclone is more effectively converted into motion of rotation about the axis of the cyclone, and less turbulence and eddy currents are set up; this significantly improves the operation of the cyclone.

We claim as our invention:

1. A method of flash-separating a liquid mixture comprising the steps of flowing said mixture through a confined channel, discharging said liquid from said channel substantially tangentially into an enlongate tubiform reduced pressure zone of enlarged cross sectional area, thereby causing rapid flash vaporization and expansion of a part of the liquid and thereby forming a dispersion of fine residual liquid drops in the resulting vapor, while imparting thereto a whirling motion about the axis of said tubiform zone, flowing said dispersion as a combined stream through said zone with a generally helical motion and thereby settling said drops toward the peripheral region of said zone and coalescing the drops, withdrawing all residual liquid together with said vapor as a mixture after passage through said zone and introducing it directly into a centrifugal separating zone with a whirling motion about the axis of the separating zone, settling the liquid toward the peripheral region of the separating zone, and separately discharging vapor and liquid from the separating zone.

2. A method according to claim 1 wherein the said helical motion of the mixture in the tubiform reduced pressure zone is changed substantially to flow parallel to the axis of the tubiform zone prior to withdrawal of the mixture therefrom and the mixture is introduced into said separating zone tangentially thereto.

3. A method of flash-separating a high-boiling hydrocarbon oil fraction comprising heating the oil to the vaporizing temperature of certain of its constituents, flowing the heated oil through a confined flow channel, discharging the oil from said channel substantially tangentially into one end of an elongate tubiform reduced pressure zone having a cross sectional area several times that of the said confined channel, thereby causing rapid flash vaporization of said constituents of the oil and expansion thereof and forming a dispersion of fine residual oil drops in the resulting vapor, while imparting thereto a vortical motion about the axis of the tubiform zone, flowing said dispersion as a combined stream with a vortical motion through said tubiform zone and thereby settling said drops toward the peripheral region of the tubiform zone and coalescing the drops, continuing the travel of the mixture through said tubiform zone until substantial equilibrium between vapor and liquid is attained, the heat supplied to the oil during the said heating step supplying substantially all of the heat for the vaporization, changing the motion of said combined stream from vortical to substantially linear flow near the other end of the zone, withdrawing the total mixture from said other end of the zone and feeding the said total mixture directly into a centrifugal separating zone substantially tangentially thereto, thereby imparting a vortical movement to the mixture, flowing the mixture with a vortical motion through the separating zone while settling the liquid toward the peripheral region thereof, separately discharging vapor and liquid from the separating zone, and applying a suction to the vapors to reduce the pressure prevailing in the separating zone and in the said tubiform zone.

4. A flashing apparatus comprising an elongate transfer tube, an expansion device near one end of said tube having a cross sectional area that is small in relation to that of said tube and disposed to admit vaporizing liquid tangentially into said tube for passage therethrough with a rotary motion, and a cyclone separator having the inlet thereof connected to receive liquid and vapor from the other end of said tube, said tube and the said inlet to the cyclone separator being essentially unobstructed for the free flow of liquid and vapor as a combined stream.

5. In combination with the apparatus according to claim 4, a vortex breaker situated in said tube remote from the inlet end thereof, said vortex breaker providing flow guides extending longitudinally and disposed to oppose the rotary motion of fluids flowing through the tube, said inlet of the cyclone separator being disposed at a peripherally outer wall thereof and the said tube being connected substantially tangentially to said wall.

6. Apparatus according to claim 4 wherein said transfer tube is inclined downwards toward the cyclone separator for drainage of liquid into the separator.

7. Apparatus according to claim 4 wherein said tube has a circular cross section for a major part of its length that includes said one end and has a transition section at said other end the cross sectional shape of which changes progressively from circular to rectangular, the inlet of the cyclone separator being correspondingly rectangular in outline and formed in an outer wall thereof to which the transition section is connected tangentially.

8. Apparatus according to claim 4 wherein said tube has a length equal to at least ten times the diameter thereof, sufficient to cause liquid and vapor formed upon expansion of liquid through said expansion device to reach substantial equilibrium prior to entry into the cyclone separator.

9. Apparatus for flash-vaporizing residual oil to separate the oil into constituents of different volatilities comprising means for supplying a stream of heated oil at superatmospheric pressure; an elongate transfer tube closed at the inlet end and having a length at least ten times the diameter thereof; a pipe having a diameter small in relation to the diameter of said tube connected to receive said heated oil and communicating with said tube closely adjacent said closed inlet end thereof and tangentially with respect thereto for admitting said oil into the tube with a vortical motion about the tube axis while suddenly releasing the oil into the enlarged space within the tube and causing a flash-vaporization of certain constituents thereof; a vortex breaker including flow guide vanes situated within said tube at a point remote from said inlet end, said vanes extending longitudinally and being disposed to oppose the said vortical motion of the oil; a transition section at the discharge end of the tube that changes gradually from a circular to a rectangular cross section; a cyclone separator having an upright outer wall with a rectangular inlet opening therein, said transition section of the tube being connected to the cyclone separator at said inlet opening substantially tangentially to the said outer wall for transfer of all oil from the tube together with said vaporized constituents into the cyclone; outlets for separately withdrawing vapor and liquid from said cyclone; and evacuating means connected to the vapor outlet of the cyclone for creating a subatmospheric pressure in said transfer tube at the inlet end thereof.

10. Apparatus for reducing the pressure of a two-phase stream containing liquid drops dispersed in a gas comprising a tube, an inlet having a cross sectional area that is small in relation to that of said tube and disposed tangentially to said tube to admit said stream tangentially for passage through the tube with a rotary motion, and a vortex device having a tangential inlet connected to receive said stream from said tube, said tube and the inlet to the vortex device being essentially unobstructed for the free flow of the total two-phase stream.

References Cited in the file of this patent

UNITED STATES PATENTS

| | | |
|---|---|---|
| 1,416,995 | Stroud | May 23, 1922 |
| 1,427,322 | Pomeroy | Aug. 29, 1922 |
| 1,870,193 | Grahame | Aug. 2, 1932 |
| 2,059,522 | Hawley | Nov. 3, 1936 |
| 2,413,420 | Stephanoff | Dec. 31, 1946 |
| 2,636,430 | Brown et al. | Apr. 28, 1953 |